United States Patent [19]
Jones

[11] Patent Number: 5,242,058
[45] Date of Patent: Sep. 7, 1993

[54] SEPARATOR SCREEN TIE-DOWN

[75] Inventor: Bradley N. Jones, Walton, Ky.

[73] Assignee: Sweco, Inc., Florence, Ky.

[21] Appl. No.: 794,474

[22] Filed: Nov. 19, 1991

[51] Int. Cl.$^5$ ............................................. B07B 1/49
[52] U.S. Cl. ................................... 209/403; 209/315;
209/399; 403/259; 411/339; 411/432
[58] Field of Search ............... 209/315, 319, 323, 332,
209/363, 399, 403, 405; 411/222, 339, 366, 372,
374, 429, 430, 432, 910; 403/259, 260, 261

[56] References Cited

U.S. PATENT DOCUMENTS

| | | | |
|---|---|---|---|
| 3,485,363 | 12/1969 | Talley, Jr. ........................ | 209/332 X |
| 3,871,785 | 3/1975 | Murvall ............................ | 403/259 |
| 4,670,136 | 6/1987 | Schmidt et al. .................. | 209/403 |
| 4,872,795 | 10/1989 | Davis ............................... | 411/432 X |
| 5,052,871 | 10/1991 | Collins ............................. | 411/366 |

Primary Examiner—Joseph E. Valenza
Assistant Examiner—Tuan N. Nguyen
Attorney, Agent, or Firm—Lyon & Lyon

[57] ABSTRACT

A screen tie-down for a vibratory separator has a pedestal with a base plate and a post. The post has internal right hand threads for engaging the screen center support stud, and external left hand threads. A jam nut is threaded onto the support stud against the top end of the post. A cap having internal threads is turned onto the external threads of the post. All adjustments to the pedestal height can be made from above the screen and the tie-down cannot be overtightened.

18 Claims, 3 Drawing Sheets

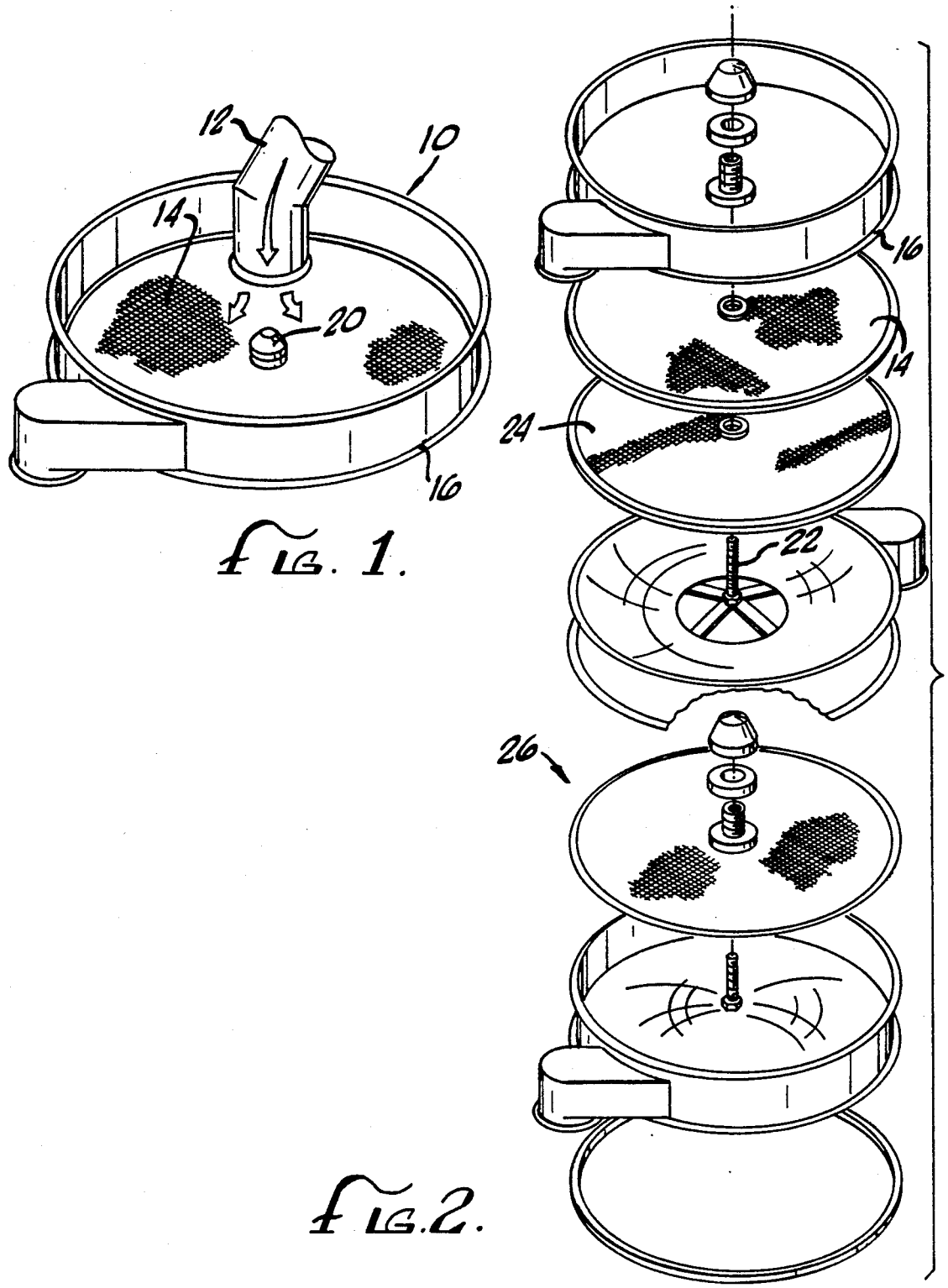

SEPARATOR SCREEN TIE-DOWN

The filed of the invention is vibratory separators.

Vibratory separators separate different particle sizes from both wet and dry materials, using screens. See, for example, Naeher, U.S. Pat. No. 2,296,293, Talley, U.S. Pat. No. 3,485,363 and Jones, U.S. Pat. No. 4,810,372. Typically, the screen in a separator is agitated or vibrated to move the material being separated through and over a screen to a discharge chute or to a finer particle screen. The screens generally are fixed or tied down at specific points, and typically at the center of a circular screen. The tie-down supports the screen to avoid undue sagging and stresses and also helps to provide the desired agitating or vibrating screen movement by setting the unsupported spans of the screen. The tie-down is generally fastened to a threaded stud passing through a clearance opening in the screen.

Various screen tie-downs have been used in the past. However, these known screen tie-downs can be relatively time-consuming to install and adjust, typically require the use of tools, and are often subject to over-tightening or loosening.

SUMMARY OF THE INVENTION

Accordingly, it is an object of the invention to provide an improved screen tie-down. Other objects and features will appear hereinafter.

To these ends, a vibratory separator has a screen tie-down including a pedestal with a flat base plate. A post attached to the base plate has internal threads which are engageable to the threaded stud. The post also has external threads running in an opposite direction to the internal threads, i.e., if the threaded stud has right hand threads the internal threads on the post would be right hand threads as well, and the external threads on the post would be left hand threads. A jam nut also has internal threads for engaging the threaded stud. A cap has internal threads engageable to the external threads on the post.

The pedestal is threaded onto a stud in a separator and adjusted to the desired position. The screen is placed over the pedestal, or the pedestal is brought up from underneath to support the screen on the base plate of the pedestal. The jam nut is then threaded onto the stud and tightened against the top end of the post of the pedestal. The cap is then threaded onto the external threads of the post (turning in the opposite direction) until the cap moves down to clamp the screen in between the base plate of the pedestal and the lower surface of the cap.

BRIEF DESCRIPTIONS OF THE DRAWINGS

In the drawings, wherein similar reference characters denote similar elements throughout the several views:

FIG. 1 is a perspective view fragment of a vibratory separator;

FIG. 2 is an exploded perspective view fragment of a vibratory separator having multiple screens and a screen self-cleaning feature;

DETAILED DESCRIPTION OF THE DRAWINGS

Figure 3:
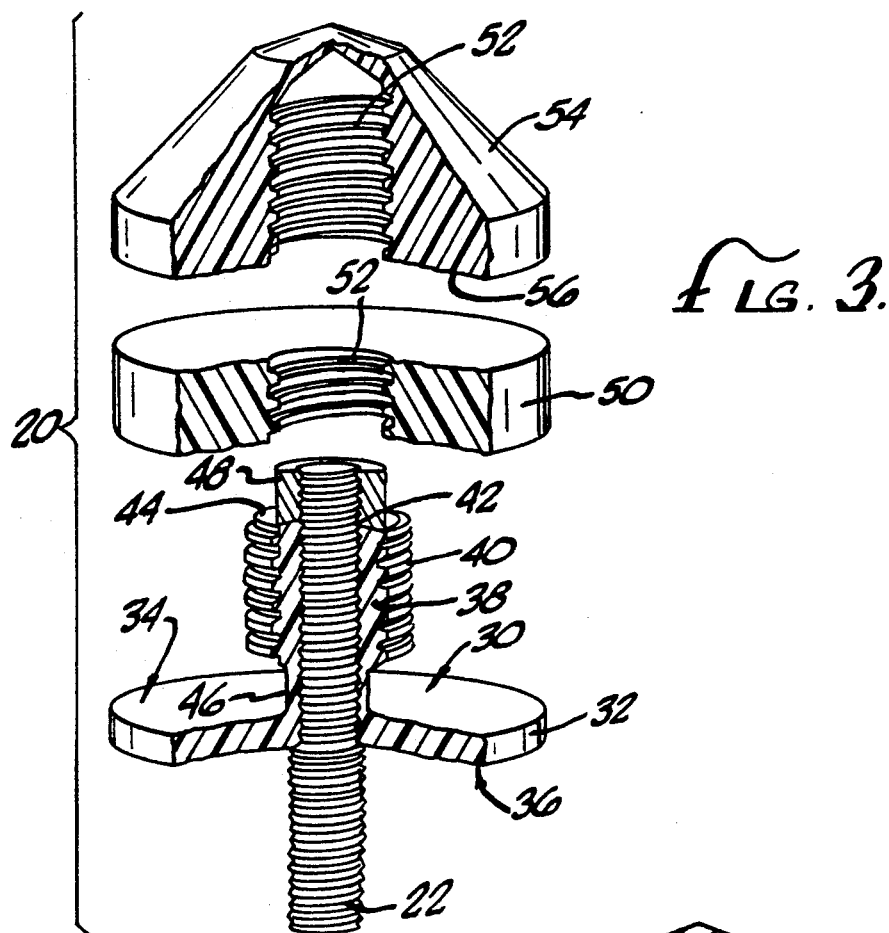
FIG. 3 is an enlarged perspective view, in part section of the present tie-down for use with a separator having the self-cleaning feature.

Turning to the drawings, as shown in FIGS. 1 and 2, a vibratory screen separator 10 has a feed chute 12 and a vibrating screen 14 within a screen frame 16. A discharge chute 18 is attached to the screen frame 16 above the screen 14. A screen tie-down 20 is installed at the center of the screen 14.

As shown in FIG. 2, optionally a second screen 24 is positioned below the screen 14 to provide a self-cleaning function. Balls or rings (sliders) supported on the second screen 24 bounce upwardly into the screen 14 to provide a cleaning function for the screen 14, as is well known in the art. A threaded stud 22 extends upwardly, passing through the screens 24 and 14 and engages the present screen tie-down 20. Additional screen stages, such as second stage 26 may be provided. For clarity of illustration only, all tie-down 20 components are shown above the screen 14 in FIG. 2, whereas their actual positions are as shown in FIGS. 3–6.

Turning to FIG. 3, the present screen tie-down 20 includes a pedestal 30 having a base plate 32 with a flat top surface 34 and a flat bottom surface 36. A post 38 extends perpendicularly from the base plate 32. The post has an internal right hand thread 42, which optionally may extend through the base plate 32 as well. Preferably, the internal thread 42 is a ⅝-11 UNC female thread, to engage the thread on the standard stud 22. The post 38 also has a left hand external thread 40, preferably a 1-⅛ Acme left hand thread for a reliable, tough and quick attachment. Of course, the thread directions could each be reversed for use with a left-hand threaded stud, and other thread sizes and pitches may be used. A relief section 46 may be provided between the external threads 40 and the top surface 34 of the base plate 32. The post 38 has a flat top end 44.

A jam nut 48 is threaded onto the stud 22, against the flat top end 44 of the post 38. Preferably, the jam nut 48 has flats so that it can more easily be turned by hand or with a tool. Similarly, flats are also advantageously provided on the upper end of the external threads on the post.

A spacer 50 has a flat top and bottom and an internal thread 52 which is engageable onto the external thread 40 on the post 38. The spacer 50 is used with a separator having a screen self-cleaning feature including a second screen 24 below the first screen 14.

Figure 5:
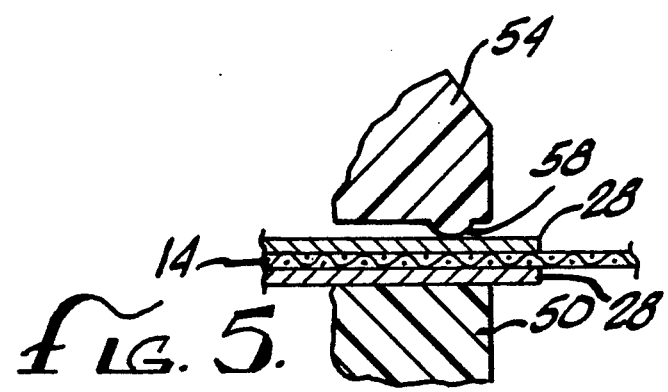
FIG. 5 is an enlarged section view fragment of an alternate embodiment of the cap of FIG. 4.

A cap 54 has an internal thread 52 which is also engageable onto the external thread 40 on the post 38. The cap 54 is dome-shaped and has a smooth exterior to prevent the screened product from accumulating in the nuts or threads of the tie-down. The cap 54 has a flat bottom 56. In an alternative embodiment, as shown in FIG. 5, the cap 54 has a lip seal 58 on its bottom surface, to replace rubber washers which are typically provided between the screen and clamping surfaces to seal out screened material from the tie-down. The spacer may also have a lip seal 58 on its lower surface.

Figure 6:
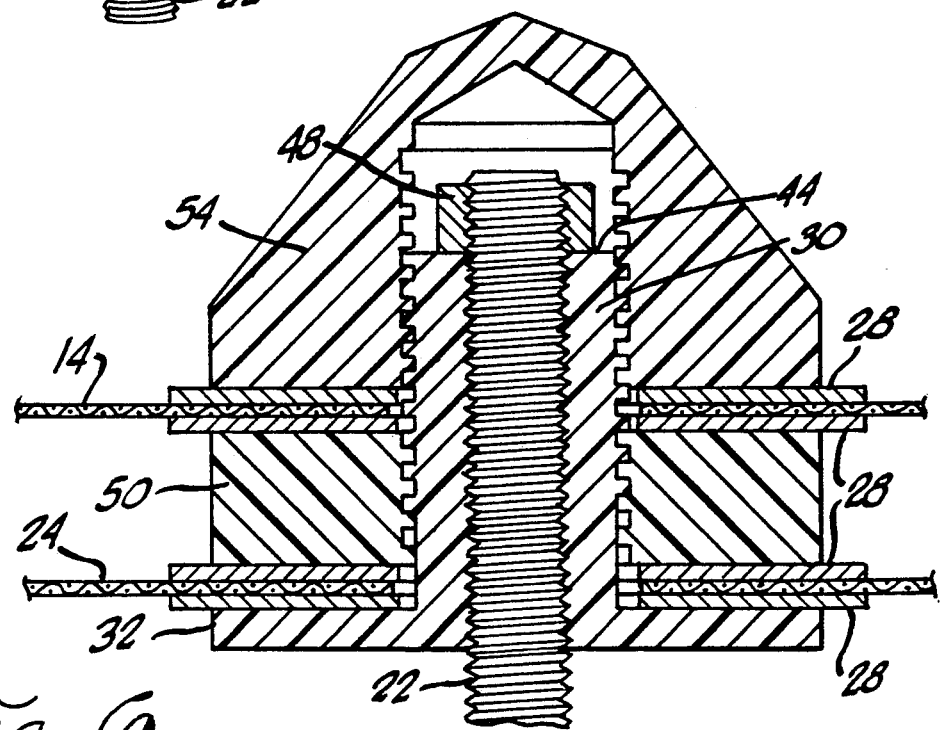
FIG. 6 is a section view of the tie-down of FIG. 3 installed in a separator.
Figure 4:
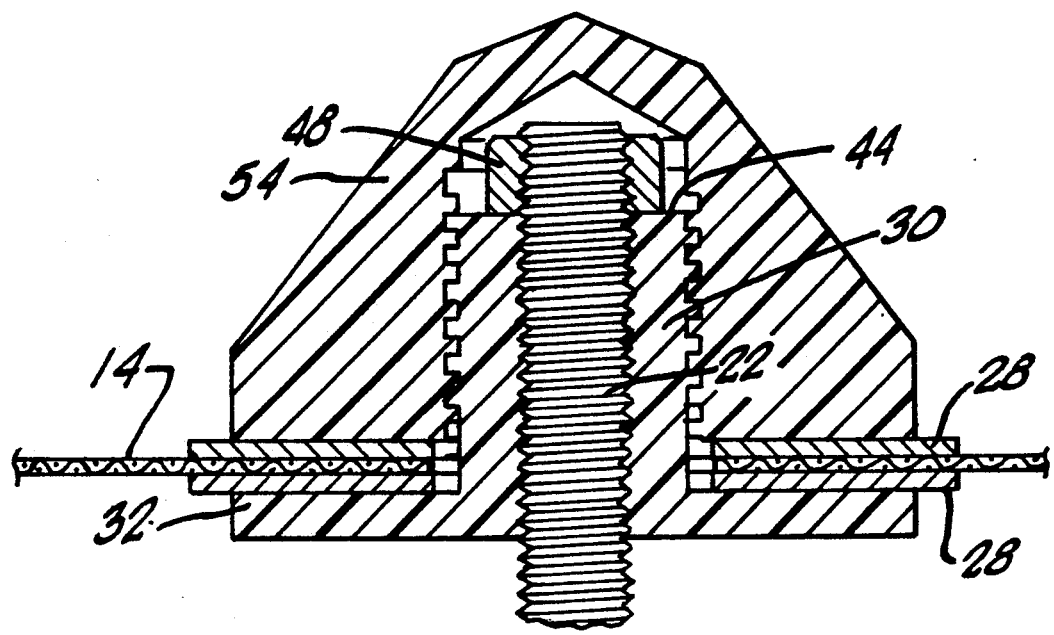
FIG. 4 is a section view fragment of the present tie-down installed on a separator without the screen self-cleaning feature.

Turning to FIG. 6, the tie-down 20 is shown installed in a separator having a first screen 14 and a second screen 24 for self cleaning. Each screen has a clearance hole for the stud 22 and pedestal post 38. Washers 28 are sandwiched over each screen around the clearance hole. The pedestal 30 is threaded onto the stud 22 and is turned down until it is at the appropriate height on the stud 22. The second screen 24 is then installed and passes over the post 38 and is supported by the base plate 32. The spacer 50 is then threaded onto the post 38 (in an opposite direction) and is brought down onto the washer 28 on top of the second screen 24. The first screen 14 is then placed over the post 38 and is supported by the top surface of the spacer 50. The jam nut 48 is then threaded onto the stud and is turned up against the flat top end 44 of the post 38. The cap 54 is then threaded onto the external threads of the post 38 and is turned until it clamps the top screen 14 against the spacer 50. This installation, as well as adjustments to the pedestal height, can be done above the screen 14 and 24 and without tools. In addition, the overall height of the pedestal can be quickly raised or lowered from above the screen by loosening the jam nut and rotating the pedestal.

The lip seal 58 of the embodiment of FIG. 5 is clamped and seals against the uppermost washer 28. This e.g., Nylon to metal seal is effective for all but the finest materials, for which rubber gaskets are preferably used.

As the cap is tightened down, the pedestal is turned in a direction which urges it upwardly, into the jam nut. Therefore, no matter how much the user tightens the cap, there is no slippage.

As will be apparent to those skilled in the art, if both the internal and external threads of the pedestal were running in the same direction, a jam nut would be required below the pedestal. With the reverse direction threads described above, the pedestal tries to rise up as the cap is tightened down, allowing the use of an easily accessible top side jam nut. In addition the jam nut is hidden beneath the cap.

Preferably, the pedestal, spacer and cap are made of nylon and have outside diameters of about 3.50 inch. The thickness of the spacer 50 depends upon the spacing between the first and second screens and is typically about 1 inch. The cap may also be provided with flats to facilitate grabbing it by hand or with a tool.

Thus, while several embodiments have been shown and described, it would be obvious to those skilled in the art that many modifications may be made thereto, without departing from the spirit and scope of the present invention.

What is claimed is:

1. A vibratory separator having a screen tie-down comprising:
    a pedestal having a base plate, and a post attached to the base plate, the post having a first et of threads running in a first direction and a second set of threads running in a second direction opposite to the first direction;
    a jam nut having threads engageable to a threaded stud on the separator; and
    a cap spaced apart from the jam nut and having threads engageable to the second set of threads.

2. The vibratory separator of claim 1 further comprising a generally flat bottom surface on the cap.

3. The vibratory separator of claim 2 wherein the base plate is flat.

4. The vibratory separator of claim 1 wherein the cap is generally conical.

5. The vibratory separator of claim 1 further comprising flat on the jam nut.

6. The vibratory separator of claim 1 wherein the cap comprises Nylon.

7. The vibratory separator of claim 1 wherein the first set of threads are right hand threads and the second set of threads are left hand threads.

8. The vibratory separator of claim 1 wherein threads of the second direction have a larger pitch than the threads of the first direction.

9. The vibratory separator of claim 1 wherein the cap covers over the jam nut.

10. A vibratory separator having a screen tie-down comprising:
    a pedestal having a base plate, and a post attached to the baseplate, the post having a first set of threads running in a first direction and a second set of threads running in a second direction opposite to the first direction;
    a jam nut engageable onto a threaded stud of the separator;
    a cap having threads engageable to the second set of threads; and
    a spacer having internal threads engageable to the second set of threads.

11. The vibratory separator of claim 10 further comprising a flat top surface and a flat bottom surface on the spacer.

12. The vibratory separator of claim 10 wherein the base plate, spacer and cap having approximately equal diameters.

13. A screen tie-down comprising:
    a pedestal having a flat base plate and a post attached to and extending perpendicularly from the base plate, the post having an outside diameter having cap threads, and an inside diameter having stud threads, with the cap threads having a larger thread pitch than the stud threads and with the cap threads on stud threads running in opposite directions;
    a nut having an inside diameter having stud threads;
    a cap having an inside diameter cap threads; and
    a spacer in between the cap and the flat base plate of the pedestal.

14. The screen tie-down of claim 13 wherein the cap threads are acme threads.

15. A screen tie-down comprising:
    a pedestal having a flat base plate and a post attached to an extending perpendicularly from the base plate, the post having an outside diameter having cap threads, and an inside diameter having stud threads, with the cap threads having a larger thread pitch than the stud threads and with the cap threads and stud threads running in opposite directions;
    a nut having an inside diameter including stud threads;
    a cap having an inside diameter including cap threads; and
    a spacer having an inside diameter including cap threads.

16. A screen-center-tie-down comprising:
    a stud having external threads;
    a pedestal threaded onto the stud and having a base plate and a post attached to the base plate, the post having external threads a larger pitch than, and running in a direction opposite to, the external threads on the stud;
    a jam nut threaded onto the stud against the post of the pedestal, the jam nut having an outside dimension less than the diameter of the external threads of the post; and a cap spaced apart from the jam nut and threaded onto the external threads of the post, over the jam nut.

17. A vibratory separator having a screen tie-down comprising:
   a pedestal having a base plate, and a post attached to the base plate, the post having a first set of threads running in a first direction and a second set of threads running in a second direction opposite to the first direction;
   a jam nut engageable to a threaded stud attached to the separator; and
   a cap having a generally flat bottom surface including a lip seal thereon and threads engageable to the second set of threads.

18. A vibratory separator comprising:
   a first screen;
   a second screen, spaced apart from the first screen;
   a threaded stud passing through the first and second screens;
   a pedestal on the threaded stud, the pedestal having a base plate and a post attached to the base plate, the post having a first set of threads running in a first direction and a second set of threads running in a second direction opposite to the first direction;
   a jam nut on the threaded stud positioned against the post;
   a cap having threads engageable to the second set of threads; and
   a spacer in between the base plate and the cap, with the first screen clamped between the base plate and the spacer and the second screen clamped between the spacer and the cap.

* * * * *